United States Patent [19]
Leisner

[11] 3,992,138
[45] Nov. 16, 1976

[54] APPARATUS FOR COMBUSTION CHAMBER TREATMENT OF METAL ARTICLES

[75] Inventor: Ernst Leisner, Gerlingen, Germany

[73] Assignee: Robert Bosch GmbH, Stuttgart, Germany

[22] Filed: Aug. 14, 1975

[21] Appl. No.: 604,490

[30] Foreign Application Priority Data
Aug. 21, 1974  Germany............................ 2440040

[52] U.S. Cl................................. 432/231; 432/162; 432/230
[51] Int. Cl.².......................................... F24J 3/00
[58] Field of Search ........... 432/227, 230, 231, 162, 432/169; 266/5 F, 33 S

[56] References Cited
UNITED STATES PATENTS
3,384,357  5/1968  Kostur, Sr............................ 432/231
3,852,028  12/1974  Reinbold et al. .................... 432/162

*Primary Examiner*—John J. Camby
*Attorney, Agent, or Firm*—William R. Woodward

[57] ABSTRACT

Deburring of metal articles and parts in a combustion chamber process is accomplished in a machine requiring only a short stroke to open and close the combustion chamber in the processing of a series of articles or parts. Only the cap plate of the combustion chamber is fixed to the upper part of the vertical frame of the machine, it being provided with the inlet for the combustion gases, and the hollow cylinder and bottom plate form a mating unit of the combustion chamber, of which a number may be provided for sequential operation, which may travel into the work position and out of it on conveyor rails. Compression to seal the parts of the combustion chamber together during combustion processing is provided by a hydraulic or pneumatic piston drive mounted on the bottom portion of the frame to bear against the bottom plate of the particular interchangeable combustion chamber unit that is located in the work position.

4 Claims, 2 Drawing Figures

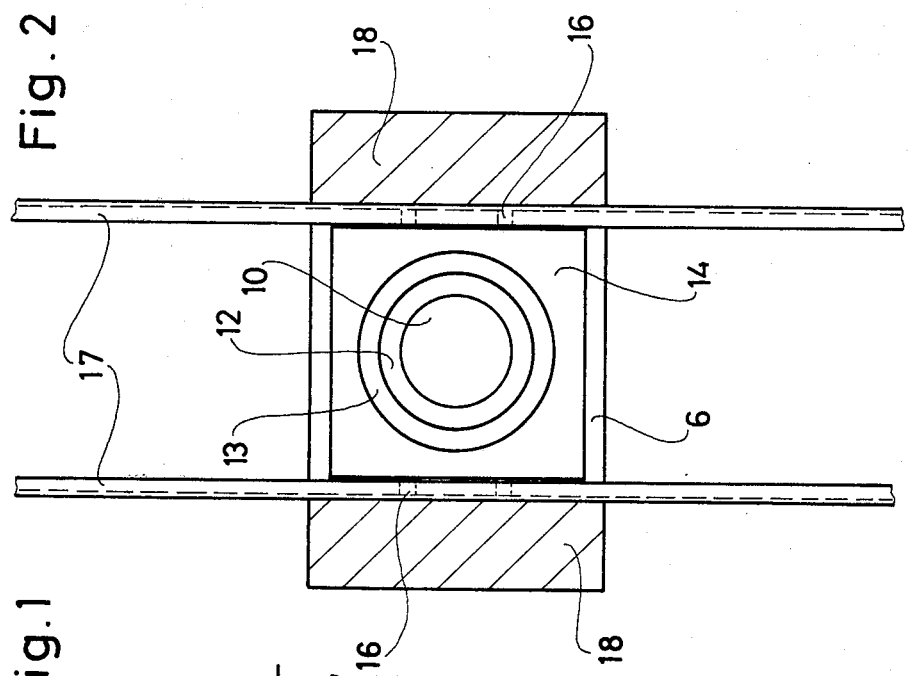
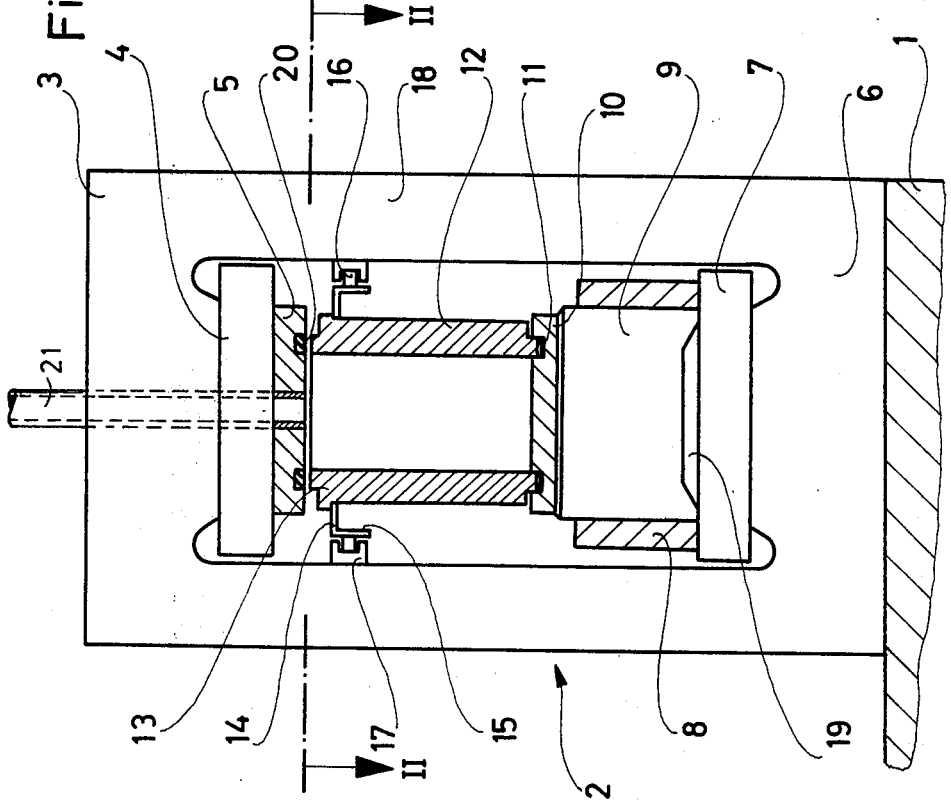

APPARATUS FOR COMBUSTION CHAMBER TREATMENT OF METAL ARTICLES

This invention concerns apparatus for treating non-combustible articles with heat in a combustion chamber and in particular the deburring of metal articles and parts by exposure to combustion chamber conditions in an operation suitable for rapidly and effectively deburring mass produced articles or parts.

Known machines have already developed for the above-mentioned purpose having a machine body in the form of a vertically disposed frame and utilizing one or more combustion chambers each consisting of two parts, essentially a hollow cylinder provided with floor and cap plates for containing and treating the work pieces and composed of two parts that can be pressed against each other to form an enclosure that is gas-tight against high pressure. In such machines a first combustion chamber part is fixed to an upper and essentially horizontally disposed section or portion of the frame and is provided with an inlet for the combustion gas mixture, while the second combustion chamber part serves for inserting and removing the work pieces and is therefore arranged to travel into and out of the frame. In its inserted position in the frame, it can be pressed against the first combustion chamber part by a vertically operating compression device to form a gas-tight seal between the two combustion chamber parts. In the known machines of the above-described general type, the cap plate and the hollow cylinder of the combustion chamber are either made in one piece or fastened together and the unit so formed is affixed to the upper frame section, whereas a number of bottom plates are set into openings provided in a round machine table or turret in which they are successively loaded with a work piece and brought under the fixed combustion chamber portion for processing of the work piece. In this work position a vertically displaceable compression rod actuated by an elbow lever and operating through the particular opening of the turret table in which the lower combustion chamber portion carrying the work piece is set, lifts the bottom plate together with the work pieces against the fixed combustion chamber portion and presses the two pieces of the combustion chamber against each other to seal them gas-tight during the combustion process.

On account of the turret table the apparatus frame for the combustion equipment must be constructed in C-shape with the open side of the C facing the turret table axis, so that a substantial construction expense is necessary in order to provide the necessary rigidity for withstanding the high compression forces brought to bear on the combustion chamber portions that exert a corresponding vertical tension force on the frame. Furthermore, the fact that the bottom plate of the combustion chamber must be pushed up, together with the work piece against the fixed combustion chamber part by a compression rod extending into the opening through the turret, a long lifting stroke of the compression rod is necessary since this stroke must correspond at least to the sum of the work piece height, the thickness of the bottom plate of the combustion chamber and the thickness of the turret table. Such a long stroke, however, requires, particularly on account of the compression force to be provided to the combustion chamber, an extraordinarily good guiding of the compression rod as well as a high stability of the elbow lever that actuates it, in order to assure sufficiently against buckling of the compression apparatus.

The compressive junction of the two combustion chamber parts requires the bringing to bear of an amount of compression force that, on the one hand, must be able to withstand the pressure load that is provided by the combustion process during the operation and, on the other hand, must not be excessive in order to preserve the combustion chamber parts and, above all, their sealing provisions or parts, so that they may serve for many operations. It has been possible to provide a compression force satisfying these requirements in the known compression devices in which the elbow lever is practically in fully extended position in the compression condition, at some trouble involving the insertion spacing disks or the like. On account of the unavoidable wear of the moving parts of the compression device, the magnitude of the compression force must be continuously checked and from time to time a new adjustment must be made, which is unusually expensive and difficult and accordingly requires the provision of specially educated personnel.

It is an object of the present invention so to modify and improve machines for thermal deburring of work pieces of the above-described type that the deficiencies and short-comings just mentioned can be avoided. In particular, it is an object of the present invention to accomplish the object just mentioned in such a way that at the same time the construction of the machine can be simplified and made more compact and, further, to enable the effective and secure closing of the combustion chamber to be easily checked on a continuous basis and to be correctable without requiring highly educated personnel for the purpose.

SUMMARY OF THE INVENTION

Briefly, the cap plate is fixed to the upper frame section and a lower and substantially horizontally disposed section of the frame carries compression equipment in the form of a cylinder and piston combination that is operated hydraulically or pneumatically, and then the hollow cylinder and bottom plate of the combustion chamber are fastened firmly together into a unit that is arranged to travel into and out of the frame, passing through a work position between the cap plate and the cylinder-piston combination, at which work position the compression and combustion operations take place.

By these features of the invention, the stroke required for closing the combustion chamber by the compression equipment is reduced to a minimum that in practice needs to correspond merely to overcoming the spacing that is necessary in order to enable the traveling portion of the combustion chamber to travel into the frame without collision with other parts and likewise to travel out after the operation.

Moreover, the provision of the compression equipment inside the frame, in consequence of its hydraulic or pneumatic actuation, makes it possible to monitor or check the compression force easily on a continuous basis with a manometer and when necessary to correct it easily by readjustment of the pressure medium supply. This is particularly convenient when the machine must be readjusted to a different pressure for the combustion chamber, which may for example be desirable for the treatment of another kind of work piece.

In the apparatus of the invention it is now possible, and particularly advantageous, to provide the frame with a substantially full circle cross-sectional shape, thus in O-shaped instead of in C-shape. With such a construction a light and nevertheless sufficiently rigid form of construction can be provided utilizing known construction design and materials.

It has also been found useful in connection with the present invention to fasten the cylinder of the cylinder and piston equipment permanently to the lower frame section and for the piston of this unit to bear directly with its upper face against the insertable and removable part of the combustion chamber.

It is furthermore advantageous to provide the traveling part of the combustion chamber with a circumferential external ridge on its hollow cylinder and to suspend the unit thereby in a carrier plate that travels on rails mounted above the machine table and affixed on inner surfaces of essentially vertical frame portions. In this manner it is also possible to provide if desired an automatic operation with a considerable number of traveling combustion chamber units interchangeably used in succession, so that except for short periods of moving one unit out of the work position and another one in, there is always a combustion chamber unit in the work position for the combustion process, while in the meanwhile other traveling combustion chamber units are relieved of the processed work pieces and supplied with new articles or parts to be treated.

On the whole, the apparatus of the present invention is distinguished by a much simpler, space-saving and economical form of construction that nevertheless is more readily managed and more reliable in operation.

BRIEF DESCRIPTION OF THE DRAWING

The invention is further described by way of illustrative example by reference to the annexed drawing, in which:

FIG. 1 is a side view of a frame with combustion chamber and compression mechanism, shown partly in vertical section; and FIG. 2 is a cross section along the section line II—II of FIG. 1.

DESCRIPTION OF THE PREFERRED EMBODIMENT

On a diagrammatically indicated machine base or pedestal 1 a frame 2 of O-shaped overall cross section is affixed as shown in FIG. 1. The generally vertical frame 2 carries the cap plate 5 of a combustion chamber firmly affixed by means of an intermediate plate 4 to the upper and horizontally disposed section 3 of the frame. On the lower horizontal section 6 of the frame there is mounted, likewise with the interposition of a mounting plate 7, a cylinder-piston unit of which the cylinder 8 is fixed, while the piston 9 is vertically movable.

The piston 9 operates with its upper face directly against the bottom plate 10 of the combustion chamber, the bottom plate 10 being firmly connected to the hollow cylinder 12 of the combustion chamber with the provision of a seal 11, the structure and material of which are not shown in the drawing.

The combustion chamber part composed of the bottom plate 10 and the hollow cylinder 12 is suspended in a carrier plate 14 by means of a circumferential outer ridge 13 on the cylinder 12. The carrier plate 14 has rollers 16 respectively provided on downwardly extending brackets 15. The carrier plate 14 travels on the rollers 16 which run on rails 17 of C-shaped cross section, which are affixed to the inside of the vertical members 18 of the frame 2.

In this manner, articles or parts to be treated can be inserted in the combustion chamber unit 10, 12 while the latter is outside of the frame 2, after which this combustion chamber unit can be moved into the frame along the rails 17. Then, when the combustion chamber unit is in the work position centered in the frame, the cavity 19 underneath the piston 9 is caused to expand by the provision of oil under pressure by means not shown in the drawing, provided in the well-known way, as the result of which the combustion chamber unit 10, 12 is pressed against the cap plate 5 and the combustion chamber is closed in a gas-tight fashion by the seal 20.

After the combustion process is carried out in the combustion chamber thus closed, the hydraulic pressure in the cavity 19 is again removed, so that the combustion chamber portion 10, 12 drops away somewhat from the cap plate 5 and is seated again on the carrier plate 14, on which it can then be rolled out of the frame 2 on the rails 17.

The combustion gas mixture is supplied to the combustion chamber through an inlet 21 which is only diagrammatically shown in the drawing, since its construction follows the known form of construction for such devices, this inlet of course being provided in the fixed member of the combustion chamber, in this case the cap plate 5.

Although the invention has been described with reference to a particular illustrative and preferred embodiment, it is understood that variations and modifications are possible within the inventive concept.

In order to refer briefly to both hydraulic and pneumatic pressure media, the expression "fluid pressure medium" is used herein to refer collectively to liquid and gaseous pressure media. Preferably embodiments of this invention should utilize, for their better operation, other inventions of the same inventor described in copending applications as follows: If the combustion mixture is mixture of hydrogen and oxygen, the inlet 21 symbolically shown herein is preferably constituted in the form shown in application Ser. No. 606,447, filed Aug. 21, 1975, corresponding to German application P 24,40,041.7, wherein if propane or acetylene is used it is preferably in the form shown in application Ser. No. 605,334, filed Aug. 18, 1975 and now abandoned, corresponding to German application P 24 39 982.4. The combustion temperature is preferably monitored as shown in application Ser. No. 614,929, filed Sept. 19, 1975, corresponding to German application G 74 32 518.1.

I claim:

1. Apparatus for subjecting non-combustible articles to heat accompanied by a rapid local increase of pressure in a combustion chamber, comprising, in combination:

a substantially vertical frame (2) holding substantially horizontal upper (3) and lower (6) portions thereof in spaced relation to each other and capable of resisting pressure tending to force said portions vertically apart;

an upwardly open combustion chamber unit having a peripheral wall (12) and a bottom member (11) together capable of withstanding vertical compression;

vertical displacement and compression means mounted on said lower frame portion for upwardly displacing and pressing said combustion chamber unit when said unit is interposed between said upper frame portion and said displacement and compression means, said displacement and compression means including a cylinder (8) arranged to receive a fluid pressure medium, and a piston (9) arranged in said cylinder to be moved upwardly by pressure of said medium and thereby to displace said combustion chamber unit upward;

means (16, 17) for conveying said combustion chamber unit into and out of said frame so disposed as to enable said combustion chamber unit to be positioned between said upper frame portion and said vertical displacement and compression means, and a top plate for said combustion chamber unit affixed to said upper frame portion and arranged to be sealed gas-tight to said combustion chamber unit when said combustion chamber unit is pressed upward against said top plate by said displacement and compression means, said top plate being provided with combustion gas inlet means for the combustion chamber formed by said combustion chamber unit and said top plate, said combustion chamber unit being further so constructed that pressure applied by said vertical displacement and compression means serves to deal said peripheral wall and bottom member of said combustion chamber unit into gas-tight condition and simultaneously to seal said peripheral wall to said top plate in gas-tight condition in each case sufficiently to withstand thereafter a rapid increase in pressure within said combustion chamber.

2. Apparatus as defined in claim 1, in which said frame (2) is substantially of full circle configuration in horizontal cross section.

3. Apparatus as defined in claim 1, in which said cylinder (8) of said veritical displacement and compression means is affixed to said lower frame portion (6) and said piston (9) of said vertical displacement and compression means impinges directly with its upper face against said bottom member (11) of said combustion chamber unit.

4. Apparatus as defined in claim 1, in which said peripheral wall (12) of said combustion chamber unit is provided with a circumferential ridge (13) and is arranged to be suspended by said ridge in a carrier plate (14) of said conveying means arranged to travel on rails (17) of said conveying means affixed respectively on inward facing surfaces of substantially vertical portions (18) of said frame.

* * * * *